Jan. 16, 1934.   R. R. WARE   1,943,881
ROLLER
Filed Dec. 5, 1930
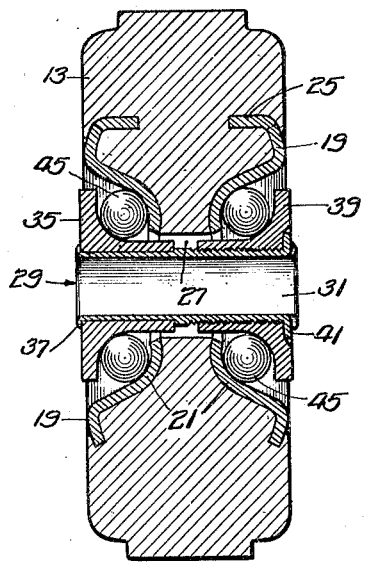
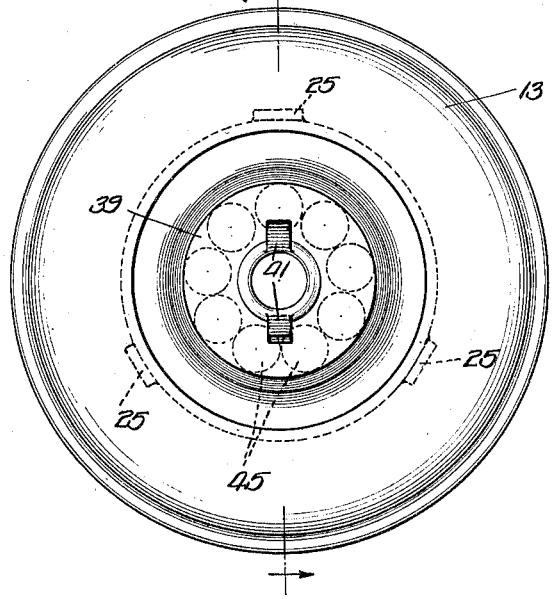
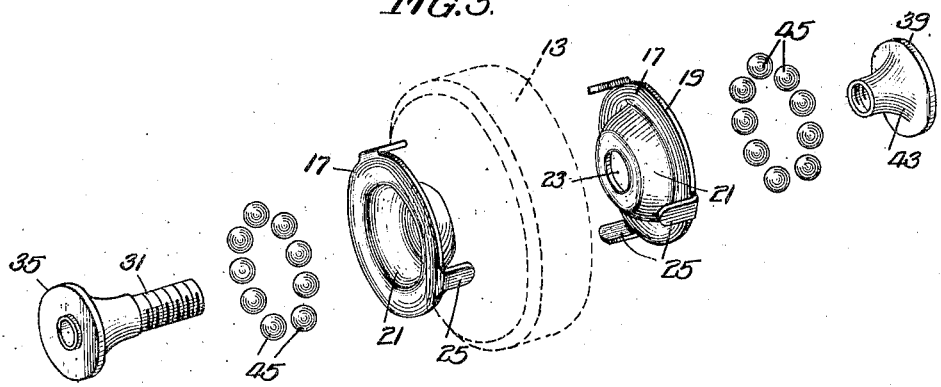
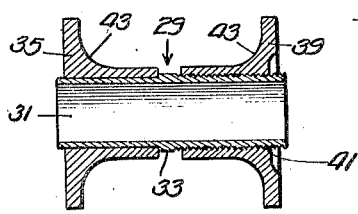
INVENTOR:-
ROBERT R. WARE
By: Cheever, Cox & Moore  Attys Patented Jan. 16, 1934

1,943,881

UNITED STATES PATENT OFFICE 1,943,881

ROLLER

Robert R. Ware, Chicago, Ill., assignor to Chicago Roller Skate Company, Chicago, Ill., a corporation of Arizona Application December 5, 1930. Serial No. 500,178

1 Claim. (Cl. 208—181)

My invention relates in general to wheels and has more particular reference to a wheel adapted for use on roller skates or as a caster, and for general purposes; and an important object of the invention is to provide a novel and improved roller bearing for use in devices of this general character.

Another important object of the invention is to provide an adjustable bearing which may be applied to wheels of varying thickness, the bearing being automatically adjustable during its assembly to the wheel, whereby the slight deviation in thickness more particularly in moulded wheels may be accommodated at minimum expense.

As is well known to those skilled in these matters, much thought has been expended in the design and manufacture of devices of this nature, and seemingly slight changes in construction produce important changes in durability, ease, and accuracy of manufacture, the number of parts to be made and assembled, and the cost of producing the device, and my purpose is to provide a roller in which the number of parts, the number of assembly operations, and the cost of producing and assembling the parts are reduced to a minimum while the roller is rendered as rugged, durable, and efficient in operation as possible.

Another important object is to provide a cheap and simple adjustable roller bearing without sacrificing strength or efficiency of operation.

Still another object is to provide a simple method of assembling a bearing in a member of indeterminate thickness.

Numerous other objects and advantages will be apparent from the following description which, taken in connection with the accompanying drawing, discloses a preferred embodiment of the invention.

Referring to the drawing—

Figure 1 is a perspective view of a wheel embodying my invention;

Figure 2 is a cross section taken substantially along the line 2—2 in Figure 1;

Figure 3 is an exploded view of the parts forming the device of Figures 1 and 2; and Figure 4 is a sectional view of an adjustable roller retaining member forming a portion of the device.

To illustrate my invention, I have shown on the drawing a wheel or roller 11 particularly adapted for use on roller skates, casters, and in other places where a substantially frictionless roller is desired.

In the illustrated embodiment the roller 11 comprises a rim 13 of suitable mouldable material, preferably pressed paper, although rubber and other mouldable compositions may be employed. The rim is provided with a bearing adjustable so that it may be assembled to the rim in a manner to accommodate for slight variance in rim thickness, such as may easily occur in a number of rims, even though produced in the same mould. The bearing comprises a pair of annular plates 17 having a substantially flat peripheral rim 19 and a central dished portion 21, the bottom of which is provided with a central perforation 23. The members 17 also are provided with offset lugs 25 which are preferably formed integral with the rim 19, and which are for the purpose of digging into the body of the rim 13, as indicated in Figure 2 of the drawing. The rim 13 is formed with a central perforation 27 which is widened to form depressions on either side of the wheel, said depressions substantially conforming with the shape of the dished portion 21 of the face plates 17, and the plates are mounted one on either side of the rim in these depressions, preferably while the rim is still in a semi-plastic condition. In fact, if desired, the plates may be moulded in position as a part of the moulding operation by which the rim is formed. After the material, of which the rim is formed, solidifies, the face plates 17 will be firmly secured on opposite faces of the wheel. The face plates are adapted to form ball races and to cooperate with an adjustable retaining member 29, which is illustrated in Figure 4 of the drawing. The retaining member 29 comprises a cylindrical tube 31 having a shoulder 33 at approximately its midpoint to provide an abutment against which one end of an annular retaining member 35 may engage. The annular retaining member has a central bore adapted to frictionally engage the reduced outer surface at one end of the tube 31 between the shoulder 33 and the end of the tube, and said end of the tube is adapted to be peened over, as shown at 37 in Figure 1 of the drawing, for the purpose of securing the retaining member 35 in place on the tube and preventing relative axial movement thereof. The tube also is externally threaded from a point adjacent the shoulder 33 to the opposite end of the tube, and a second retaining member 39 having an external configuration similar to that of the retaining member 35, but provided internally with screw threads for cooperating with the threaded portion of the tube 31, is also provided. The retaining member 39 also is provided with notches or kerfs 41 so that, after the member has been assembled on the threaded portion of the tube 31 to a desired adjusted position, the projecting outer end of the tube may be riveted into the notches 41 to thereafter prevent rotation of the member 39 wih respect to the tube 31. When so assembled, the members 35 and 39 present oppositely facing annular ball retaining surfaces 43 having a curved external cross-sectional configuration and adapted to cooperate with the dished portions 21 of the face plates 17 to provide retaining means for a plurality of balls 45. A plurality of balls 45 are arranged circularly in each of the dished portions 21 around the central openings 23 thereof, the edge of the openings being forced slightly upwardly to provide an annular track in the bottom of the dished portions 21. This track having been filled with balls on one side of the roller, the threaded end of the tube 31 is inserted through the central bore 27 of the wheel until the retaining surface 43 of the member 35 rests upon the balls 45. The wheel is then inverted, the member 35 being held in position against the balls 45, and a second series of balls is arranged in the bottom of the other face plate and around the threaded end of the tube 31, which of course is now projecting through the perforation 23 in the bottom of said face plate. The retaining member 39 is then threadingly assembled to the end of the tube 31 and is adjusted thereon until the desired ball retaining position is reached. If the parts are assembled too tightly, there will be a binding action on the balls and the wheel will not rotate freely. If the parts are too loosely assembled, the wheel will wobble. When the desired adjustment is obtained, the threaded end of the tube 31 protruding from the outer face of the retaining member 39 is smashed into the notches or kerfs 41 thereon as by means of a cold chisel.

It will be obvious that an exact adjustment of the ball retaining member may be accomplished so that, even though considerable variation in the thickness of the moulded wheel is encountered, that is to say, the bearing parts may be applied to any wheel within a substantial range of wheel thickness such as is usually encountered in production, particularly in the production of moulded wheels.

Although I have described my invention as applied to a moulded wheel, it will be obvious that certain features of the invention may be applied to other than moulded wheels, and I do not necessarily limit my invention to the particular type or class of wheel described since it is obvious that numerous changes may be made in the form, construction, and arrangement of the several parts without departing from the spirit or scope of my invention, or sacrificing any of its attendant advantages, the form hereinbefore described being a preferred embodiment for the purpose of illustrating the novel features of my invention.

Having thus described my invention, what I claim as new and desire to secure by Letters Patent is:

A roller for roller skates comprising a preformed cylindrical block made of moldable material and having a central opening therethrough, an annular plate fastened on each side of the block and having a central opening alining with the central opening in the block, each plate having a central dished portion surrounding the opening and forming a ball race, a tube passing through the alined openings and through which a shaft is adapted to extend, an annular ball retaining member carried by the tube, a shoulder on the tube to position the member thereon, said member adapted for cooperation with one of said plates to form a ball race, balls in said race, a second ball retaining member threadedly engaging said tube and cooperating with the other of said plates to provide a ball race, and balls in said last named race, said last named retaining member having a notch therein, said tube having a portion thereof deformed and receivable in the notch whereby the last named retaining member is fixedly connected to the tube, said block extending from its outer periphery inwardly between the plates substantially to the openings in the plates.

ROBERT R. WARE.